United States Patent [19]

Lidzey

[11] Patent Number: 5,441,648

[45] Date of Patent: Aug. 15, 1995

[54] SEPARATION OF HEAVY METALS FROM AQUEOUS MEDIA

[75] Inventor: Raymond G. Lidzey, London, United Kingdom

[73] Assignee: Bio-Separation Limited, Middlesex, United Kingdom

[21] Appl. No.: 244,027

[22] PCT Filed: Sep. 24, 1993

[86] PCT No.: PCT/GB93/02003

§ 371 Date: May 16, 1994

§ 102(e) Date: May 16, 1994

[87] PCT Pub. No.: WO94/07800

PCT Pub. Date: Apr. 14, 1994

[30] Foreign Application Priority Data

Sep. 25, 1992 [GB] United Kingdom ............... 9220269

[51] Int. Cl.$^6$ .............................. C02F 1/48; C02F 1/62
[52] U.S. Cl. ................... 210/695; 210/717; 210/912; 210/913; 210/914
[58] Field of Search ............... 210/695, 717, 912–914, 210/631, 702

[56] References Cited

U.S. PATENT DOCUMENTS

| 3,142,638 | 7/1964 | Blaisdell et al. | 210/695 |
| 3,697,420 | 10/1972 | Blaisdell et al. | 210/695 |
| 3,960,723 | 6/1976 | Butler | 210/695 |
| 3,983,033 | 9/1976 | de Latour | 210/695 |
| 4,294,705 | 10/1981 | Hellestam | 210/695 |
| 4,502,958 | 3/1985 | Sasaki | 210/695 |
| 4,701,261 | 10/1987 | Gibbs et al. | 210/695 |
| 4,735,725 | 4/1988 | Reischl et al. | 210/695 |
| 4,806,264 | 2/1989 | Murphy | 210/695 |
| 4,839,052 | 6/1989 | Maree | 210/912 |
| 4,861,493 | 8/1989 | Jansen | 210/912 |
| 4,981,593 | 1/1991 | Priestley et al. | 210/695 |
| 5,000,853 | 3/1991 | Reischl et al. | 210/695 |
| 5,308,500 | 5/1994 | Schwarzbach | 210/912 |

FOREIGN PATENT DOCUMENTS 0186445 7/1986 European Pat. Off. .

Primary Examiner—Neil McCarthy
Attorney, Agent, or Firm—Cushman Darby & Cushman

[57] ABSTRACT

Heavy metals are separated from aqueous media containing the same by contacting the said medium with finely divided iron oxide ($Fe_3O_4$) and finely divided ferrous sulphide, maintaining said contact until at least a substantial proportion of said heavy metal has become bound to said iron oxide and ferrous sulphide, and then separating the iron oxide and ferrous sulphide having heavy metal bound thereto from the aqueous medium.

8 Claims, 2 Drawing Sheets

SEPARATION OF HEAVY METALS FROM AQUEOUS MEDIA

This invention relates to the separation of heavy metals, especially toxic metals, from aqueous media containing the same, e.g. industrial effluents.

There is a need for simple and effective methods for removing heavy metals, especially toxic heavy metals such as cadmium, from industrial effluents and other aqueous media which contain them. Treatment to remove heavy metals is necessary before effluent can be sent to waste and there are increasingly stringent requirements for acceptably low levels of such metals.

In our European specification 0186445A we described a process for the separation of metals from aqueous media in which an aqueous medium containing a paramagnetic metal is contacted with cellular particles, e.g. bacteria, in the presence of a compound converted by the particles into a product which interacts with the metal and causes the metal to become bound to the particles which are then separated magnetically. In one embodiment of this process Desulphovibrio bacteria which reduce sulphate to sulphide are used. When the aqueous medium containing the paramagnetic metal is contacted with Desulphovibrio in the presence of dissolved sulphate, a water-insoluble sulphide of the metal is formed on the cell wall of the Desulphovibrio and is thereby removed from the aqueous medium.

The present invention provides an improved method for removing heavy metals, which need not be paramagnetic, from aqueous media containing them. The new method is simple to use, can be operated without the use of microorganisms and rapidly removes a very large proportion of the heavy metals present in the aqueous medium.

The process of the present invention for the separation of a heavy metal from an aqueous medium containing the same comprises contacting the said medium with finely divided iron oxide ($Fe_3O_4$) and finely divided ferrous sulphide, preferably formed in situ and preferably physically attached to the iron oxide, maintaining said contact until at least a substantial proportion of said heavy metal has become bound to the said iron oxide and ferrous sulphide, and then separating the iron oxide and ferrous sulphide having the heavy metal bound thereto from the aqueous medium, preferably by magnetic means. The iron oxide used in the present invention is $Fe_3O_4$, sometimes called magnetite, a term which however includes both mineral and synthetic $Fe_3O_4$. Only synthetic $Fe_3O_4$ is used in the present invention.

The iron oxide used in the present invention must be very finely divided and must in particular have a particle size less than about 1 micron. Iron oxide of this grade is produced by a precipitation process and is obtainable commercially.

According to a preferred embodiment of the present invention the ferrous sulphide is produced biologically by growing sulphate reducing bacteria, e.g. Desulphovibrio, in a nutrient medium in the presence of dissolved ferrous sulphate. The medium may be as described by Postgate, "The Sulphate Reducing Bacteria", Cambridge University Press, sec. ed, 1984. Iron sulphide is formed round the growing bacteria and clumps of bacteria having ferrous sulphide adherent thereto settle at the bottom of the culture vessel and can be removed as a slurry. For use in the present invention, this slurry at a concentration at 1 to 10% w/v, preferably about 3% w/v, ferrous sulphide in water is mixed with the iron oxide in a ratio of 50 to 500 parts by volume of the ferrous sulphide slurry to 1 part by weight of the iron oxide. The slurry obtained containing both ferrous sulphide and iron oxide may then be used to treat 100 to 1,000 times its volume of aqueous medium containing heavy metal.

In an alternative embodiment of the present invention, the ferrous sulphide is formed in situ in the presence of the iron oxide by mixing the iron oxide with an aqueous solution of ferrous sulphate, preferably containing 5 to 25% w/v of ferrous sulphate heptahydrate. The proportion of iron oxide may be preferably from 0.5 to 5% by weight of the solution. An aqueous solution of an alkali metal sulphide, e.g. sodium sulphide nonahydrate, is then added in stoichiometric amount in relation to the ferrous sulphate, as a concentrated aqueous solution containing, for example, 10% to 30% by weight of the sulphide. Ferrous sulphide is thereby precipitated on the iron oxide and a slurry is obtained. This slurry may be adjusted as necessary to contain 1 to 5% w/v of ferrous sulphide and 0.5 to 5% w/v of iron oxide. The slurry may be used to treat the aqueous medium containing the heavy metal at a rate of 1 part by volume of slurry to 100 to 1,000 parts by volume of the aqueous medium.

DESCRIPTION OF THE DRAWINGS

In the accompanying drawings,

In FIG. 1, the aqueous medium to be purified is placed in container A and the ferrous sulphide and iron oxide are added. The mixture is stirred for a sufficient time for any heavy metal present in the aqueous medium to become bound to the ferrous sulphide, e.g. for 1 to 2 hours. The aqueous mixture is then allowed to flow by gravity through valve B into the entrance port c of the magnetic separator. The aqueous mixture flows upwardly through the magnetic separator where it passes over a matrix of magnetic stainless steel balls (each having a diameter in the range 0.2 to 2 cm). The electromagnet is powered by an electric current of about 180 amps to give a calculated field strength of 0.85 Tesla. The actual field strength is slightly different as the magnetic ball matrix affects the field strength. The iron oxide and adherent ferrous sulphide are held magnetically on the ball matrix and the substantially clear purified aqueous medium overflows through port F to discharge. The aqueous mixture may be passed over the matrix at a rate of about 1 gallon (4.5 liters) per minute. When all the aqueous mixture has flowed out of container A, the valve B is closed and the electric current switched off. The iron oxide and ferrous sulphide may then be washed off the ball matrix by adding water at E and draining off the washings through valve D. Substantially all (e.g. 90 to 95%) of the heavy metal originally in the aqueous medium may thereby be recovered attached to the iron oxide and ferrous sulphide. The zone occupied by the ball matrix may have, for example, a height of 35 cm and a cross section of $13 \times 4$ cm.

FIG. 2 shows diagrammatically the construction of a magnetic separator suitable for continuous operation. The effluent is passed upwardly through the magnetic matrix between the poles of a powerful electro-magnet. Magnetic stainless steel balls are added at the top of the magnetised zone and intermittently withdrawn at the bottom of the zone by means of the indicated programmed ratchet operated rotor. Flow of the effluent mixture is cut off and the magnet is temporarily switched off while the ratchet operated rotor is in operation. The magnetic stainless steel balls removed by the rotor have the iron oxide and ferrous sulphide deposited thereon. The iron oxide and ferrous sulphide are then washed off the magnetic balls and the latter are returned to the top of the magnetised zone.

The following Examples illustrate the invention.

Example 1

Biological Preparation of Ferrous Sulphide

Desulphovibrio was grown on a nutrient medium having the following composition:

| | |
|---|---|
| Potassium dihydrogen phosphate | 0.5 g |
| Ammonium chloride | 1.0 g |
| Sodium sulphate | 4.5 g |
| Calcium chloride hexahydrate | 0.06 g |
| Magnesium chloride heptahydrate | 0.06 g |
| Sodium lactate | 6.0 g |
| Yeast extract | 1.0 g |
| Ferrous sulphate heptahydrate | 0.004 g |
| Sodium citrate dihydrate | 0.3 g |
| Tap water | to 1 liter |

About 50 liters of the nutrient is adjusted to pH 7 and a negative Redox of $-100$ mV and an innoculum of the Desulfovibrio was added. The fermentation was continued at 32° C. for 15 days with further additions of sodium sulphate and sodium lactate in solution in the same bulk ratio on about the 5th and 10th day. Further iron is added continuously as ferrous sulphate solution during the period of the fermentation at the rate of 1-2 grams per hour. Slow mixing is, maintained throughout the 15 day period. It is then discontinued for 24 hours to allow the solids to settle before syphoning off the spent nutrient, leaving the ferrous sulphide sludge for collection.

Ferrous sulphide forms as a deposit around the growing bacteria and clumps of the bacteria bound together by the ferrous sulphide settle at the bottom of the culture vessel from where they can be removed. The slurry used in the test described below contained about 3% ferrous sulphide w/v. It was mixed with one part by weight of iron oxide having a particle size of about 1 micrometer per 100 parts by volume of the slurry. This combined ferrous sulphide/iron oxide slurry was then used at the rate of 1 part by volume for 300 parts by volume of the aqueous medium to be purified.

Example 2

Chemical Preparation of Ferrous Sulphide

Iron oxide having a particle size of about 1 micron was mixed with a 20% w/v solution of ferrous sulphate heptahydrate in the proportion of 1 part by weight of iron oxide to 50 parts by volume of the ferrous sulphate solution. An equal volume of 25% sodium sulphide nonahydrate solution was then added with continuous stirring at ambient temperature. A slurry of iron oxide and ferrous sulphide is thereby obtained. This slurry is added to the aqueous medium to be purified in the proportion of 1 part by volume per 300 parts by volume of aqueous medium to be purified.

Example 3

Figure 1:
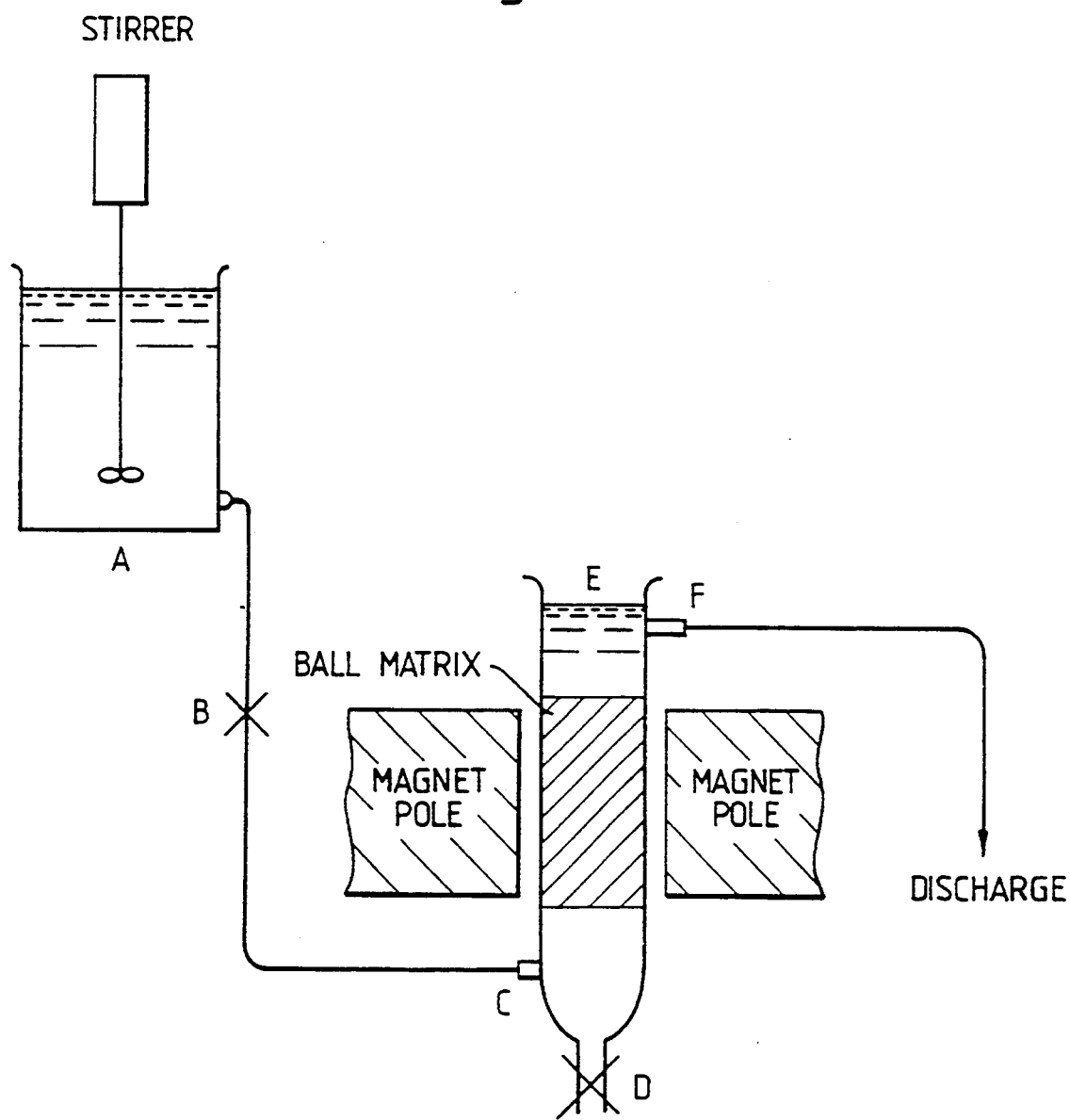
FIG. 1 shows diagrammatically a system for the treatment of batches of aqueous media containing a heavy metal.
Figure 2:
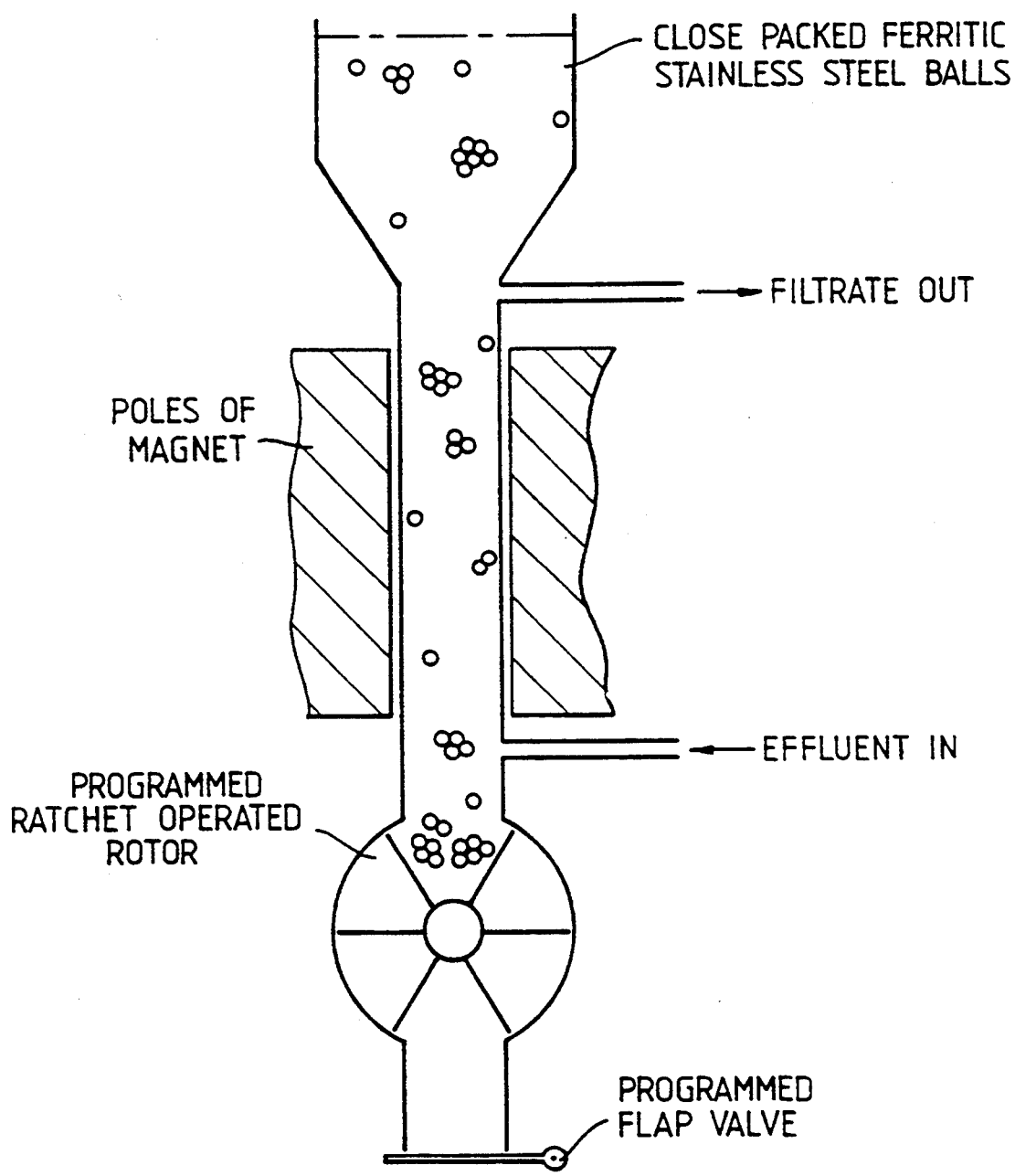
FIG. 2 shows an apparatus suitable for continuous treatment of effluents using the new process.

Using an apparatus of the kind shown diagrammatically in FIG. 1, water contaminated with cadmium was mixed with the slurry prepared as described in Example 1 or 2 above in vessel A for 1 to 2 hours. The magnetic separator and the tubing connections were filled with water and the magnet was switched on. Valve B was then opened and the aqueous mixture from vessel A was allowed to flow under gravity through valve B and port C up through the ball matrix. The aqueous medium from which the slurry particles have been removed overflows through port F. The flow rate was controlled at 1 gallon (about 4.5 liters) per minute using valve B. After the aqueous mixture had passed through the magnetic matrix, the latter was washed free of the iron oxide and ferrous sulphide by adding water at opening E while the electromagnet was switched off. The washings are removed through valve D.

The following Table shows the initial concentrations of cadmium in parts per million and the concentrations of cadmium in the purified aqueous medium after 5, 15 and 25 liters of medium had flowed through the magnetic matrix.

| | Using Biological Slurry of Example 1 | Using Slurry of Example 2 |
|---|---|---|
| Before mixing with slurry | 5.1 | 5.0 |
| After 5 Liters | 0.05 | 0.06 |
| After 15 Liters | 0.06 | 0.06 |
| After 25 Liters | 0.06 | 0.07 |

Cadmium contents were determined by flame atomic absorption.

The purified effluent was also tested for iron content to measure the efficiency of the magnetic separation process. It was found that at flow rates of 4, 2 and 1 liters of slurry per minute through the magnetic matrix the iron content of the effluent was respectively 2, 1 and 0.5 ppm. This compares with the initial iron content in the slurry (using either the biological or inorganic slurry) of about 85 ppm.

I claim:

1. Process for the separation of a heavy metal from an aqueous medium containing the same which comprises contacting the said medium with ferrous sulfide physically attached to finely divided synthetic iron oxide ($Fe_3O_4$) having a particle size less than about 1 micron, maintaining said contact until at least about 90% of said heavy metal has become bound to said ferrous sulphide, and then separating magnetically the iron oxide and ferrous sulphide having heavy metal bound thereto from the aqueous medium.

2. Process according to claim 1 in which the ferrous sulphide is formed in situ in the presence of the iron oxide in such a way that it becomes physically attached to the iron oxide.

3. Process according to claim 2 in which the ferrous sulphide is formed in situ in the presence of the iron oxide by reaction of ferrous sulphate in solution with a water-soluble sulphide.

4. Process according to claim 1 in which the ferrous sulphide is formed in situ by the action of a sulphate-reducing bacterium on iron sulphate dissolved in the aqueous medium.

5. Process according to claim 4 in which the bacterium is Desulphovibrio.

6. Process according to any of claims 1 to 5 in which the heavy metal is one or more of cadmium, uranium, lead, copper, mercury, cobalt, chromium and nickel.

7. Process according to any one of claims 1 to 5 in which the weight ratio of iron oxide to ferrous sulphide is from 1:1 to 1:10.

8. Process according to any one of claims 1 to 5 in which the total concentration of iron oxide and ferrous sulphide in contact with the said medium is from 0.01 to 1% w/v.

* * * * *